Dec. 4, 1934.   J. C. ALBRIGHT   1,983,429
REGULATING SYSTEM
Filed Oct. 22, 1930   2 Sheets-Sheet 1

INVENTOR
Joseph C. Albright,
BY
ATTORNEY

Dec. 4, 1934.    J. C. ALBRIGHT    1,983,429
REGULATING SYSTEM
Filed Oct. 22, 1930    2 Sheets-Sheet 2

INVENTOR
Joseph C. Albright,
BY
ATTORNEY

Patented Dec. 4, 1934

1,983,429

UNITED STATES PATENT OFFICE 1,983,429

REGULATING SYSTEM

Joseph C. Albright, Cleveland Heights, Ohio, assignor to Bailey Meter Company, a corporation of Delaware Application October 22, 1930, Serial No. 490,534

9 Claims. (Cl. 172—239)

My invention relates to improvements in regulating systems and in particular to the regulation of apparatus having a factor which, during operation of the apparatus, tends to vary from a predetermined value and where the regulating system is responsive to such variations; operating to return the factor to the predetermined value.

Such apparatus may for example be vapor-generating boilers, flowing streams of fluid, or the like where a factor such as pressure or temperature may tend to vary from a predetermined value and which is desirably kept at or near the predetermined value.

If the regulating system were started in operation upon deviation of the factor from the predetermined value and continued in operation until the effect of its operation were felt, over-regulation and hunting might occur. It is desirable in the regulation of such apparatus to, upon deviation of the factor from its desired value, introduce an increment of regulation, cease regulation for a time interval, then introduce a further increment of regulation if such is needed. Preferably the length and frequency of the increments of regulation will vary in accordance with the amount of departure of the factor from the predetermined value.

One object of my invention is to provide a regulating system combining these attributes, wherein the length and frequency of regulating increments may be varied and in operation, upon a predetermined deviation of the factor from the predetermined value, increments of regulation of a certain time length will be applied and upon a further predetermined deviation of the factor from the predetermined value increments of regulation of a different time length and frequency will be applied.

A further object is to provide a regulating system wherein is adjustable the amount of deviation of the factor from the predetermined value before the increments of regulation of different duration than those initially applied are made effective.

Another object is to provide a regulating system having electric contactor means wherein upon a predetermined deviation of the factor from its desired value, regulating impulses of a certain time length will be originated, the time length and frequency of these impulses being adjustable, and upon a further predetermined deviation of the factor from the desired value, regulating impulses of the same or different time length will be originated to regulate supplementary control means.

Still another object is to provide a regulating system wherein upon a predetermined departure of the factor from the predetermined value, a signal or alarm or other supplementary device may be operated.

Other objects will be obvious or will become apparent from the description hereinafter.

As an example, but in nowise a limitation, I have chosen to illustrate and will describe a pressure control system wherein the positioning of a valve means in a conduit will effect a variation or control of the pressure of a fluid flowing through a conduit, should said pressure tend to vary from a predetermined value.

In the drawings:—

Figure 1:
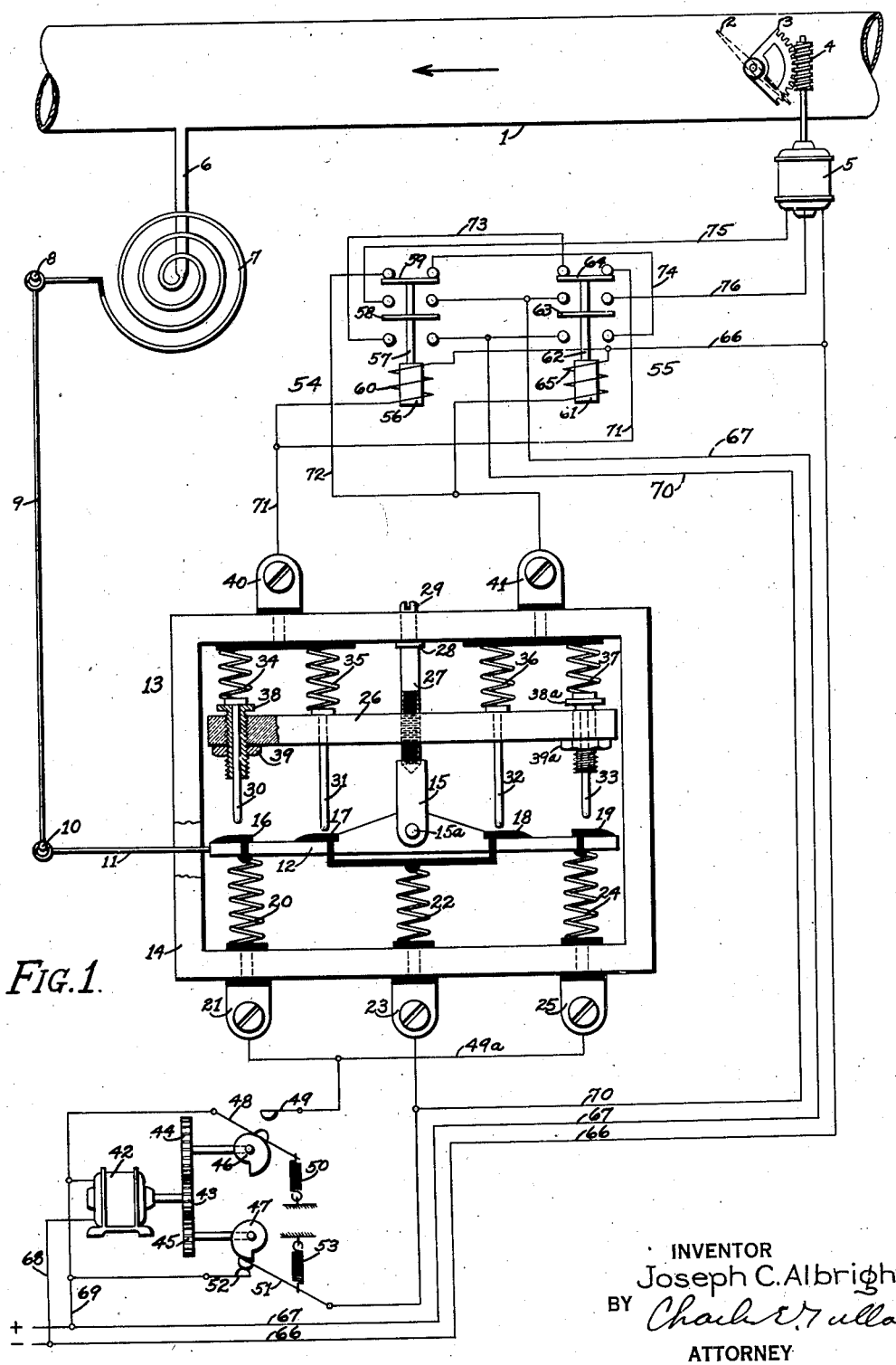
Fig. 1 represents diagrammatically a pressure regulating system embodying the invention.

Referring first to Fig. 1, I have represented at 1 a conduit adapted for fluid flow in the direction of the arrow, and in which may be positioned a valve means or damper 2 through the medium of a worm gear 3 and a worm 4, the latter being driven by reversible means, illustrated as a reversible motor 5, for varying the flow and/or pressure of the fluid. A pipe 6 is connected to the conduit on the outlet side of the damper and leads to a Bourdon tube type of pressure responsive device indicated at 7 having an extension on its free end forming the pivot 8 from which a rod 9 is suspended. Variations in pressure within the conduit 1 will result in the pivot 8 tending to move in a clockwise or counterclockwise direction through the well known operation of the Bourdon tube.

The rod 9 serves the purpose of transmitting motion from the Bourdon tube 7 to the movable part of a contactor generally indicated at 13, to the end that certain parts of the contactor will be positioned in one direction or the other from a normal position upon deviation of pressure within the conduit from a predetermined value. Electrical circuits completed through such positioning of certain parts of the contactor 13 then become effective to energize the reversible motor 5 in one direction or the other for a corrective positioning of the damper 2, to the end that the pressure to which the Bourdon tube 7 is responsive will tend to return toward its predetermined value. At the lower end of the rod 9 is a pivot 10 attached to one end of an arm 11 which extends from the case 14 of the contactor; the arm 11 being a continuation of a member 12 which is fulcrumed at 15a in a projection 15 of the case 14.

The fulcrumed member 12 has located on it in desirable spaced relation, the contact plates 16, 17, 18 and 19 of suitable conducting material. Contact plate 16 is in electrical connection with a terminal 21 through the medium of a flexible connector 20. Contact plates 17 and 18 are joined together by conducting material, and through the medium of a flexible connector 22 are in electrical connection with a terminal 23. Contact plate 19, through the medium of a flexible connector 24 is in electrical connection with a terminal 25.

Located in the casing 14 is a member indicated at 26, extending parallel to the normal position of the fulcrumed member 12 and possible of vertical positioning through the medium of a screw 27 which is pivoted at its lower end in the projection 15 of the case 14, and has a shoulder 28 bearing against an upper part of the case 14. The member 26 and screw 27 are assembled in such a manner that rotary motion imparted to the head 29 will tend to change the spaced relation between the member 26 and the member 12 without changing the vertical position of the screw 27.

Carried by the movable member 26, which is of insulating material, are the contacting pins 30, 31, 32 and 33, so spaced relative to each other and relative to the contact plates 16, 17, 18 and 19 of the member 12 that each contacting pin lies opposite a contact plate, to the end that if the member 12 is subjected to a rotary motion around its fulcrum 15a in a clockwise direction, the contact pin 31 will close circuit with the contact plate 17, and upon further rotary motion in the same direction the contact pin 30 will close circuit with the contact plate 16. If the rotation of the member 12 around its fulcrum 15a is in a counterclockwise direction, then the contact pin 32 will close circuit with the contact plate 18, and upon further motion in the same direction the contact pin 33 will close circuit with the contact plate 19.

The contacting pins 30, 31, 32 and 33 are provided with heads at their upper ends, and are held in a normally downward position by gravity and by the spring action of the flexible connectors 34, 35, 36 and 37. They are loosely fitted through holes in the member 26 so that rotary motion of the fulcrumed member 12 will not be impeded upon successive engagements of the contact plates with the contact pins, such engagement picking up the pins and lifting them as they are successively encountered. Electrical connection is established between contact pins 30 and 31 through the medium of the flexible connectors 34 and 35 to a terminal 40, and likewise between the contact pins 32 and 33 through the medium of flexible connectors 36 and 37 to a terminal 41.

The contact pins 31 and 32 are loosely fitted directly through the member 26, whereas the contact pins 30 and 33 are loosely fitted to bushings 38 and 38a which are in turn threaded into the member 26 and held in a desired position by means of the locknuts 39 and 39a, comprising a means whereby through the screwing upwardly or downwardly of bushings 38 and 38a against the top of which the heads of the contact pins 30 and 33 rest, the dependence of the contact pins 30 and 33, below the member 26 and relative to the dependence of the contact pins 31 and 32 below the member 26, may be varied.

Thus through the medium of the threaded screw 27, by raising or lowering the member 26, the spaced relation between the contact pins 30, 31, 32 and 33 and the contact plates 16, 17, 18 and 19 may be simultaneously changed, while through the medium of the threaded bushings 38 and 38a, normally locked in position by locknuts 39 and 39a, the spaced relation of the contact pin 30 with its corresponding contact plate 16 and contact pin 33 with its corresponding contact plate 19, may be varied relative to each other or relative to the relation existing between the contact pins 31 and 32 with their corresponding contact plates 17 and 18.

I have just described in detail the construction of the contactor 13, whose fulcrumed member 12 is positioned by the Bourdon tube 7 upon deviation in one direction or the other of the pressure of the fluid in the conduit 1 from a predetermined value. Such positioning engages certain contacts to close electrical circuits which result in the operation in one direction or the other of the reversible motor 5 for positioning the damper 2. In the electrical circuits leading to the motor 5 and a part of the general regulating system, are the relays indicated at 54 and 55 as well as an interrupting mechanism controlling the duration and frequency of regulating increments. The interrupting mechanism and operation will now be described in detail.

A continuously running motor 42 drives through the gears 43, 44 and 45, preferably of different diameters, the cams 46 and 47, to the end that while the cams 46 and 47 may be rotated at the same speed, they are preferably rotated at different speeds, and are shown in the drawings to have the cam 47 rotated at a faster speed than the cam 46.

The cam 46 in its rotation causes periodic engagement between the contact fingers 48 and 49, normally held open from engagement through the medium of a spring 50. Similarly, the cam 47 in its periodic rotation causes engagement between the contact fingers 51 and 52, which are normally held open from engagement through the medium of a spring 53.

Referring now to the relays previously mentioned; at 56 is indicated a plunger actuated by the coil 60 and operating a shaft 57 which carries the contact bars 58 and 59. Similarly, the relay 55 has a plunger 61 actuated by energization of the solenoid coil 65 for moving a shaft 62 which carries the contact bars 63 and 64.

I have designated the main power lines as 66 and 67, of which conductor 66 joins directly through the conductor 68 to the continuously running motor 42 of the circuit interrupting mechanism and directly to the reversible motor 5. It further joins the neutral of the two solenoid coils 60 and 65.

The main power line 67 joins through the branch conductor 69 the continuously running motor 42 and the contact fingers 48 and 52 of the interrupting mechanism. It further leads to certain contact points of the relays 54 and 55, namely points which may be engaged by the contact bars 59 and 64.

A conductor 49a joins the contact finger 49 of the interrupting system with the terminals 21 and 25 of the contactor 13. A conductor 70 joins the contact finger 51 of the interrupting system with the terminal 23 of the contactor 13, and with certain contact points of the relays. A conductor 71 joins terminal 40 of the contactor 13 with the solenoid coil 60 of the relay 54 and with a contact point on the relay 55 normally connected through the contact bar 64 to the conductor 73 leading to a contact point on the relay 54. A conductor 72 joins the terminal 41 of the contactor 13 with the solenoid coil 65 of the relay 55 and with a contact point on the relay 54 normally connected by contact bar 59 with a conductor 74 leading to a contact point on the relay 55. Conductors 75 and 76 join respectively the relays 54 and 55 with the reversible mechanism 5.

In operation, for the desired pressure condition existing in the conduit 1, the Bourdon tube 7 will assume a definite position and through the medium of the rod 9 and extension 11, the fulcrumed member 12 will be positioned substantially parallel to the member 26. A decrease in pressure in the conduit 1 will result in a clockwise motion of the Bourdon tube 7 and a corresponding clockwise rotation of the member 12 around its fulcrum 15a, tending to bring the contact plate 17 into engagement with the contact pin 31, and the contact plate 16 into engagement with the contact pin 30, moving the contact plates 18 and 19 further from engagement with the contact pins 32 and 33.

Assume now that the pressure in the conduit 1 increases to a value whereby motion of the Bourdon tube 7 and corresponding rotary motion of the fulcrumed member 12 causes engagement of the contact plate 17 with the contact pin 31. An electrical circuit is completed through the conductor 70, the terminal 23, the flexible connector 22, the contact plate 17, the contact pin 31, the flexible connector 35, the terminal 40, the conductor 71, and the solenoid 60, to the power line 66, and if this engaged position of the contact plate 17 with the contact pin 31 persists through the cycle of rotation of the cam 47 of the circuit interrupting mechanism, then during a certain portion of that cycle of rotation of the cam 47, the contact finger 51 connected to conductor 70 will be engaged by the contact finger 52 which is joined by conductor 69 with the main power line 67 of opposite polarity, and the solenoid coil 60 will be energized.

If the pressure change in the conduit 1 has been only a slight fluctuation and has returned to the predetermined value, causing a disengagement of the contact pin 31 from the contact plate 17 before the periodic rotation of the cam 47 has caused an engagement of contact fingers 51 and 52, then no electrical circuit has been completed, and the solenoid 60 has not been energized.

If the pressure departure from the predetermined value persists longer than the time cycle of revolution of the cam 47, then the time length of energization of the solenoid coil 60 will be determined by the percentage of the circumference of the cam 47 which causes engagement between the contact fingers 51 and 52, and the frequency of such contacts will be determined by the speed of rotation of the cam 47.

Upon energization of the solenoid 60, the plunger 56 is drawn downward, carrying with it the shaft 57 and the contact bars 58 and 59. The downward motion of the contact bar 58 closes circuit between the conductor 70 and the conductor 73, which through the normal closure of the contact bar 64 of relay 55 connects to conductor 71 and to the solenoid coil 60, thus forming a by-pass connection around the contactor 13 from the conductor 70 to the conductor 71.

Simultaneously, the contactor bar 59 breaks circuit between conductor 72 and conductor 74 and closes circuit between the power line 67 and the conductor 75, to the end that the reversible mechanism 5 is energized for that period of the cycle of cam 47 of the interrupting mechanism that the contact fingers 51 and 52 are in engagement.

It will be seen that an advantage is attained through the energization of the solenoid coil 60 by engagement of the contact plate 17 with the contact pin 31 which causes the completion of a by-pass circuit around the contactor 13, while the opening from energization of the solenoid coil 60 is accomplished by the disengagement of the fingers 51 and 52. Thus through closing the circuit in the contactor 13 and the opening of it in the structurally stronger interrupting mechanism, arcing or burning of the contacts in the contactor 13 is minimized, and correspondingly these parts can be designed and built of lighter and more delicate materials to the end that a smaller force from the Bourdon tube 7 or similar device is necessary to position the member 12 about its fulcrum 15a.

If for some reason the pressure in the conduit 1 continues to fall, then the Bourdon tube 7 continues to move in a clockwise direction, the member 12 is further rotated about its fulcrum 15a in a clockwise direction, and upon a certain departure of the pressure from the predetermined value, the contact plate 16 comes into engagement with the contact pin 30. The contact plate 17 remains in engagement with the contact pin 31, lifting the pin through the member 26. The contact pin 30 is connected electrically to the terminal 40 to which the contact pin 31 is connected. Contact plate 16, however, through flexible connector 20, terminal 21 and conductor 49a is connected to contact finger 49 of the interrupter mechanism, whereas contact plate 17 was connected through, as explained above, to contact finger 51 of the interrupter mechanism.

Contact finger 49 is periodically engaged by contact finger 48 through the medium of cam 46 rotated on a definite time cycle by the gear 44 driven from the gear 43 by the continuously running motor 42. Thus periodically a circuit is closed from the main power line 67 through conductor 69, the contact finger 48, the contact finger 49, the conductor 49a, the terminal 21, the flexible connector 20, the contact plate 16, the contact pin 30, the flexible connector 34, to the terminal 40 in parallel with the circuit completed through the contact plate 17 and the contact pin 31 from the power line 67 to the terminal 40.

However, the length and frequency of engagement of the contact fingers 48 and 49 through the medium of the cam 46 is different than the length and frequency of engagement of the contact fingers 51 and 52 through the medium of the cam 47, to the end that if the pressure has deviated from the desired value more than a predetermined amount, thereby causing engagement of contact pin 30 with contact plate 16, the length of impulses and their frequency will be controlled by the operation of the cam 46 rather than by the operation of the cam 47.

The sustaining circuit in parallel with the circuit completed by the engagement of contact plate 17 and contact pin 31 above explained, operates in connection with that part of the contactor interrupting mechanism controlled by the cam 47. It is entirely independent of the engagement of the contact plate 16 with the contact pin 30, or the engagement of the contact finger 49 with the contact finger 48. Thus there is a possibility that a circuit may be broken within the contactor 13.

Should the motion of the Bourdon tube 7 cause disengagement of the contact pin 30 from the contact plate 16 at a time when the contact fingers 48 and 49 are engaged, and if the contact fingers 51 and 52 are disengaged, then the energizing circuit of the solenoid 60 will be broken at the contact plate 16 and contact plate 30. This is an infrequent possibility, however, and is a condition which will exist for only a very small percentage of the total time that the solenoid 60 is de-energized. Thus the possibility of arcing or burning of contacts within the contactor 13 has been reduced to a minimum. A decided advantage in construction is thereby obtained.

Through the use of the relay 54 it is unnecessary to have heavy current carried by the contact plates and contact pins in the contactor 13. Furthermore, the circuits have been so arranged that a minimum possibility exists of breaking a circuit in the contactor 13. The relay solenoid circuits are always completed or closed through engagement of the contacts of contactor 13, but are only in rare instances broken in the contactor, and usually are broken at the interrupter, whose interrupting fingers may be made heavy enough to stand arcing and burning. It then follows that the moving parts of the contactor 13 may be made relatively light, which is of benefit considering the usually small control force available for positioning the contacts.

If after a closure of the contact plate 16 against the contact pin 30, and corresponding transmittal of long and frequent impulses through to the reversible mechanism 5, the pressure change has been checked and tends to return toward normal or the predetermined value, then the contact plate 16 moves away from the contact pin 30, but for a certain portion of the rotation of the member 12 about its fulcrum 15a to its original or normal position, the contact plate 17 is still in engagement with the contact pin 31. This operation, then, dictates that upon a slight deviation from the desired value, infrequent contacts of a relatively short duration will be originated, whereas upon a further predetermined deviation of the factor from the desired or predetermined value, the impulses will become more frequent and of greater duration. Upon the factor approaching the desired or predetermined value after having departed from same, the longer, more frequent contacts will cease, and the shorter, less frequent ones will again be effective to ease the regulation toward the desired point, tending to prevent overtravel and hunting.

If as explained above, the pressure has decreased from the desired value, and the contact bar 17 has engaged the contact pin 31, and possibly in addition the contact bar 16 has engaged with the contact pin 30, and then suddenly the pressure has swung to a value the opposite side of the desired value, for instance has increased above normal to an extent whereby a counter-clockwise rotation of the member 12 about its fulcrum 15a occurred of an extent sufficient to open the contacts 17—31 and 16—30, and engaged the contact plate 18 with the contact pin 32 while the solenoid 60 is still energized through the sustaining circuit, then the engagement of the contact plate 18 with the contact pin 32 would immediately energize the solenoid 65 of the relay 55 and reverse the direction of operation of reversible mechanism 5. Thus precedence is taken over the previously energized solenoid 60 due to the opening of circuit between conductors 73 and 71 by the contact bar 64, they being located in the sustaining circuit of the solenoid 60. Immediately upon the disengagement of the contacts 17—31 and 16—30 the maintenance of energization of the solenoid 60 has been through the sustaining circuit by-passing the contactor 13. Then when the solenoid 65 was energized through the engagement of the contact plate 18 with the contact pin 32, the opening of the circuit between conductors 71 and 73 by the contact bar 64 breaks the sustaining circuit.

From this it will be seen that upon a deviation of a factor from a predetermined value, a circuit is completed in the contactor which energizes a relay to the end that a reversible mechanism will operate a controllable device for re-establishing the value of the factor, and that if the time closure of the contactor is quite short, the actual time length of energization of the relay solenoid may be relatively longer as sustained through the interrupter mechanism, but that upon a rapidly swinging condition of the factor under control, the operation of the reversible mechanism in the original direction will not persist and be controlled by the time cycle of the interrupter, but will be taken precedence over by the contact in the opposite direction originating in the contactor.

It is obvious that at the interrupter I have a possibility of varying the length and frequency of the contacts or closures in the circuit of the contactor. I may change the ratio of the gearing 43, 44 and 45 to vary the frequency of contacts, or I may change the shape of the cams 46 and 47 to vary the length of contact on each revolution of the cams.

In the contactor itself I may vary what is termed the "neutral", that is the amount of clockwise or counter-clockwise rotation of the member 12 around its fulcrum 15a before an engagement of the contacts 17—31 or 18—32 occurs, or I may vary relative to each other or relative to contacts 17—31 and 18—32, the engagement point of contacts 16—30 and contacts 19—33 through the medium of threaded bushings 38 and 38a.

I have described the operation in the event of a decrease of fluid pressure in the conduit 1 from the desired or predetermined value, and operation in the event of an increase in pressure would be similar in nature. I have provided a contactor wherein relatively light moving parts may be positioned by a comparatively small control force, due to the fact that only a light control current is carried to the contactor proper, and that a minimum of arcing or burning within the contactor will be experienced. I have a regulating system in which, upon a small deviation of a factor from a predetermined value, corrective impulses of a relatively small value are originated at relatively infrequent intervals, whereas should the deviation of the factor from its predetermined value be of a relatively larger amount, then the corrective impulses will be of greater value and originated at relatively greater frequency, to the end that slight deviation calls for slight corrective means, whereas greater deviation calls for a greater corrective means.

Through the adjustment possibilities available, I may vary in a desired manner the duration or frequency of energization of the reversible mechanism to produce corrective impulses of desired relative value, depending upon the amount of deviation of the factor from the predetermined value and the speed at which the deviation may occur. I obtain a result wherein the regulation is stable, with a minimum of overtravel and hunting, and at the same time speedy in operation.

Figure 2:
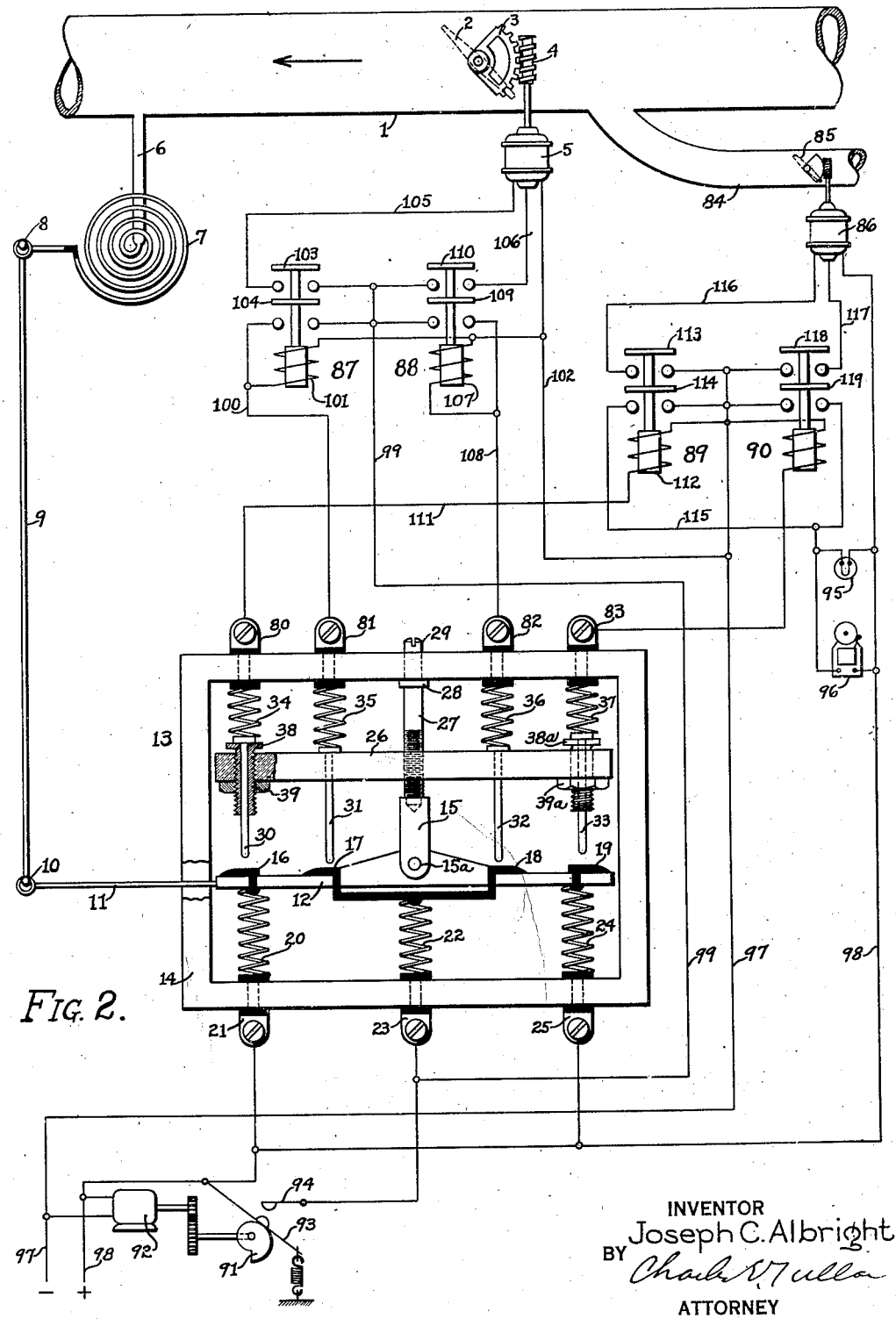
Fig. 2 represents diagrammatically a similar pressure regulating system with supplementary features.

In Fig. 2 I have illustrated and will describe an arrangement wherein upon deviation of a factor a predetermined distance from a desired value, corrective impulses are originated in the contactor 13 exactly as described for Fig. 1, but upon a further predetermined deviation of the factor from the desired value, a supplementary means is operated, as well as signals or alarms. The conduit 1 for the flowing fluid, as well as the Bourdon tube 7, the contactor 13 and connections therebetween are exactly similar in the Figures 1 and 2, and like numerals of reference have been used so that it is deemed unnecessary to describe again in detail the construction of the contactor assembly 13 as shown in Fig. 2.

There is one difference only in the contactor 13 of Fig. 2 from the contactor 13 of Fig. 1, in that four terminals, namely 80, 81, 82 and 83 are provided at the top of the contactor 13 of Fig. 2, whereas only two terminals, namely 40 and 41, are provided at the top of the contactor 13 of Fig. 1. The flexible connectors 34 and 35 in Fig. 1 are joined together and lead to the terminal 40. The flexible connectors 36 and 37 are joined together and lead to the terminal 41. In Fig. 2 the flexible connector 34 leads to the terminal 80, 35 to 81, 36 to 82 and 37 to 83, each separately and independently of the others.

Referring now in particular to the embodiment shown in Fig. 2, I have indicated at 84 a second conduit for fluid flow joining the conduit 1 and serving the purpose of providing a supplementary fluid flow for the conduit 1 in the event that the supply of fluid through the conduit 1, even with the damper 2 in a wide open position, were not sufficient to return the pressure effective upon the Bourdon tube 7 to the predetermined value. The flow of fluid through the conduit 84 is regulated by a valve means 85 actuated by a reversible means illustrated as a reversible motor 86.

Upon a predetermined decrease of the pressure within the conduit 1 from the desired value, the contact plate 17 will engage the contact pin 31 of the contactor 13 and complete circuit between the terminal 23 and the terminal 81. Upon a further departure of the factor in the same direction from the desired value, the contact plate 16 will engage the contact pin 31 and complete circuit between the terminals 21 and 80. Upon a predetermined increase of pressure, circuit will be completed between the terminals 23 and 82, and upon a further increase in pressure, between the terminals 25 and 83. Thus upon a predetermined departure of the pressure in either direction, the relays 87 and 88 connected to the terminals 81 and 82 will become effective, whereas upon a further predetermined departure of the pressure, the relays 89 and 90 will become effective from the terminals 80 and 83.

A circuit interrupting mechanism of similar function but slightly different construction than that shown in Fig. 1 is provided, wherein a single cam 91 is periodically rotated by a continuously running motor 92 to cause periodic engagement between the contact fingers 93 and 94. The proper wiring joins the contactor 13 with the interrupter mechanism, as well as the relays 87, 88, 89 and 90, the reversible motor 5, the reversible motor 86, and a signal light 95 and alarm bell 96.

In operation, assume that the pressure within the conduit 1 effective through the pipe 6 upon the Bourdon tube 7 has decreased a predetermined amount below the desired value. The member 12 in the contactor 13 tends to move in a clockwise rotation around the pivot 15a. The contact plate 17 is brought into engagement with the contact pin 31 and a circuit is completed between the terminals 23 and 81. The main power line 98 is periodically, through the action of the cam 91, connected to the terminal 23, and from the terminal 81 a conductor 100 leads to the solenoid 101 of the relay 87. The return circuit from the solenoid 101 is through the conductor 102 to the other main power line 97.

Energization of the solenoid 101 results in the contact bar 103 closing circuit between conductors 99 and 105 and the contact bar 104 completing circuit between the conductors 99 and 100. The reversible motor 5 will thus be energized for rotation in a direction to open the damper 2 and increase the pressure effective at the pipe 6 toward the desired value. The circuit completed through the contactor 13 for energization of the solenoid 101 is now by-passed by the contact bar 104 to the end that the duration of the impulse for operation of the reversible motor 5 is controlled by the cam 91 rather than by the duration of engagement of the contact plate 17 with the contact pin 31, this action being similar to that described for Fig. 1, wherein the advantage is obtained that a circuit is closed within the contactor 13, but always opened in the interrupting mechanism.

In case the pressure had increased over the desired value, resulting in a closure of the contact plate 18 with the contact finger 32, then the solenoid 107 would have been energized through the conductor 108, and the contact bar 109 would have completed the sustaining circuit between the conductors 99 and 108 while the contact bar 110 would have completed the motor operating circuit between the conductors 99 and 106 for operation of the motor 5 in the opposite direction.

Up to this point the operation upon a predetermined departure in either direction of the factor from a desired value has been exactly as described for Fig. 1. However, upon a predetermined further departure, either the relay 89 or the relay 90 will be actuated for an energization of the motor 86 and a positioning of the damper 85 as well as an operation of the signal light 95 and alarm 96. If, for example, the pressure has decreased, sufficient to cause the member 12 to move in a clockwise direction until the contact plate 16 engages the contact pin 30, then a circuit is completed from the power line 98 which joins the terminal 21, through the contactor 13 to the terminal 80, and the conductor 111, to energize the solenoid 112 of the relay 89. The result is that the contactor bar 113 joins the power line 97 to the conductor 116, causing an operation of the motor 86 in a direction to open the damper 85 and provide a supplementary flow to the conduit 1.

Simultaneously the contact bar 114 of the relay 89 will close circuit between the power line 97 and the conductor 115, resulting in a lighting of the signal lamp 95 and a ringing of the alarm bell 96. Conversely, should the pressure have returned to normal, and in fact exceeded normal in an amount sufficient to result in a counter-clockwise rotation of the member 12 wherein the contact plate 19 would engage the contact pin 33, then the relay 90 would be energized. The contact bar 118 will close circuit between the power line 97 and the conductor 117 to energize for rotation the motor 86 in a direction to close the damper 85 relative to the conduit 84, and simultaneously the contact bar 119 will close circuit between the power line 97 and the conductor 115 to light the signal lamp 95 and energize the alarm 96. Limit switches (not shown) will prevent the motor 86 from traveling beyond the equivalent of a wide open or tight closed damper position.

It will be evident that in Fig. 2 I have shown a contactor system wherein, should a factor deviate a predetermined amount from a desired value, means will be operated tending to return the factor to the desired value, and if the factor should deviate a further predetermined amount in the same direction, supplementary means will be actuated for correcting the condition, and signals or alarms will be operated.

While I have illustrated and described certain embodiments of my invention, it will be apparent that other types of mechanisms may be used to obtain the same results, and it is understood that by so illustrating and describing preferred embodiments, I have not limited the invention other than as disclosed in the claims in view of prior art.

What I claim as new and desire to secure by Letters Patent of the United States, is:—

1. A regulating system for a variable comprising in combination, control means for the variable, electric reversible means for positioning said control means, and electric circuit completing means for said electric reversible means, said electric circuit completing means comprising a contactor having a plurality of contact means which when actuated serve to effect an operation of said electric reversible means in one direction, a second plurality of contact means which when actuated serve to effect an operation of said electric reversible means in the other direction, and a fulcrumed member having a normal position and adapted to be moved in either direction about the fulcrum; means responsive to variations in value of the variable from a predetermined value for positioning said fulcrumed member from its normal position, means whereby when said fulcrumed member is moved a predetermined amount in one direction about its fulcrum it effects actuation of one of the contact means of one of the pluralities of contact means and as said member is moved a further predetermined amount in the same direction it effects actuation of a second of the contact means of the same plurality of contact means; means whereby the actuation of the first of said contact means to be actuated on movement in either direction of the member from its normal position is effective in completing an electrical circuit by-passing said actuated contact means, periodic circuit interrupting means in the by-path circuit, said by-path circuit serving to maintain in operation said electric reversible means until opened by the periodic operation of said circuit interrupting means, adjustable means for varying the duration and frequency of circuit closures of said periodic interrupting means, periodic circuit interrupting means in the electrical circuit of the second of said contact means to be actuated on movement in either direction of the fulcrumed member from its normal position, and adjustable means for varying the duration and frequency of said last-named periodic circuit interrupting means.

2. A regulating system for use with apparatus having a factor which, during operation of the apparatus, tends to vary from a predetermined value, comprising regulating means which when operated tends to restore said factor to its predetermined value, electric reversible means for positioning said regulating means, and electric circuit completing means for said electric reversible means, said electric circuit completing means comprising a contactor having a plurality of contact means which when actuated serve to effect an operation of said electric reversible means in one direction, a second plurality of contact means which when actuated serve to effect an operation of said electric reversible means in the other direction, and a fulcrumed member having a normal position and adapted to be moved in either direction about the fulcrum; means responsive to deviation of said factor from the predetermined value for positioning said fulcrumed member, means whereby when said fulcrumed member is moved a predetermined amount in one direction about its fulcrum it effects actuation of one of the contact means of one of the pluralities of contact means and as said member is moved a further predetermined amount in the same direction it effects actuation of a second of the contact means of the same plurality of contact means; means whereby the actuation of the first of said contact means to be actuated on movement in either direction of the member from its normal position is effective in completing an electrical circuit by-passing said actuated contact means, periodic circuit interrupting means in the by-path circuit, said by-path circuit serving to maintain in operation said electric reversible means until opened by the periodic operation of said circuit interrupting means, adjustable means for varying the duration and frequency of circuit closures of said periodic interrupting means, periodic circuit interrupting means in the electrical circuit of the second of said contact means to be actuated on movement in either direction of the fulcrumed member from its normal position, and adjustable means for varying the duration and frequency of said last-named periodic circuit interrupting means.

3. In a regulating system, means positioned responsive to the value of a variable, a plurality of actuating means successively made effective upon departure in one direction of said first-named means predetermined distances from a normal position corresponding to a predetermined value of the variable, said actuating means adapted to initiate corrective impulses of different time length and of different frequency depending upon amount of departure of the first-named means from said normal position, and control means adapted to be responsive to the corrective impulses of said actuating means tending to return the variable to the predetermined value.

4. In a regulating system, means positioned responsive to the value of a variable, a plurality of actuating means successively made effective upon departure of said first-named means predetermined distances in one direction from a position corresponding to a predetermined value of the variable, said actuating means adapted to initiate corrective impulses of different time length and of different frequency depending upon amount of departure of the first-named means from said position, control means adapted to be responsive to the corrective impulses of said actuating means tending to return the variable to the predetermined value, and means whereby the time length and frequency of said corrective impulses to be initiated upon predetermined amounts of departure of the variable from said predetermined value may be varied.

5. In a regulating system, means positioned responsive to the value of a variable and capable of movement in either direction from a position corresponding to a predetermined value of the variable, a plurality of electric contacts successively engaged by said means upon predetermined amounts of departure of said means from said position in one direction, a plurality of electric contacts successively engaged by said means upon predetermined amounts of departure of said means from said position in the other direction, the first of the plurality of electric contacts to be engaged by said means upon departure of the variable in either direction from said position adapted to initiate corrective impulses of a different time length and frequency than the next successively engaged contacts in the same direction, and control means actuated by such engagements for returning the variable to the predetermined value.

6. A regulating system for returning to a predetermined value a variable which may depart in either direction therefrom, comprising in combination, means responsive to the value of the variable, control means for changing the value of the variable, and means actuated by said first-named means adapted for actuating said control means by increments of different time length and of different frequency depending upon the amount of departure in one direction of said first-named means from a predetermined position.

7. In a regulating system, means positioned responsive to the value of a variable and adapted for movement in either direction from a position corresponding to a predetermined value of the variable, a plurality of electric contacts successively engaged by said means upon predetermined amounts of departure of said means from said position in one direction, a plurality of electric contacts successively engaged by said means upon predetermined amounts of departure of said means from said position in the other direction, each of the plurality of electric contacts engaged by said means upon departure of the variable in either direction from said position being effective in completing an electrical circuit by-passing said engaged contact, periodic circuit interrupting means in each by-pass circuit, control means actuated by such engagements for returning the variable to the predetermined value, and means for varying the periodic operation of each of said circuit interrupting means independently of the other circuit interrupting means.

8. A regulating system for a variable comprising in combination, control means for the variable, electric reversible means for positioning said control means, an electric circuit completing means for said electric reversible means, said electric circuit completing means comprising a contactor having a plurality of contact means which when actuated serve to effect an operation of said electric reversible means in one direction, a second plurality of contact means which when actuated serve to effect an operation of said electric reversible means in the other direction, and a fulcrumed member having a normal position and adapted to be moved in either direction about the fulcrum; means responsive to variations in value of the variable from a predetermined value for positioning said fulcrumed member from its normal position, means whereby when said fulcrum member is moved a predetermined amount in one direction about its fulcrum it effects actuation of one of the contact means of one of the pluralities of contact means and as said member is moved a further predetermined amount in the same direction it effects actuation of a second of the contact means of the same plurality of contact means; means whereby the actuation of the first of said contact means to be actuated on movement in either direction of the member from its normal position is effective in completing an electrical circuit by-passing said actuated contact means, periodic circuit interrupting means in the by-path circuit, said by-path circuit serving to maintain in operation said electric reversible means until opened by the periodic operation of said circuit interrupting means, periodic circuit interrupting means in the electrical circuit of the second of said contact means to be actuated on movement in either direction of the fulcrumed member from its normal position, and means for varying the periodic operation of each of said circuit interrupting means independently of the other circuit interrupting means.

9. A regulating system for use with apparatus having a factor which, during operation of the apparatus, tends to vary from a predetermined value, comprising regulating means which when operated tends to restore said factor to its predetermined value, electric reversible means for positioning said regulating means, an electric circuit completing means for said electric reversible means, said electric circuit completing means comprising a contactor having a plurality of contact means which when actuated serve to effect an operation of said electric reversible means in one direction, a second plurality of contact means which when actuated serve to effect an operation of said electric reversible means in the other direction, and a fulcrumed member having a normal position and adapted to be moved in either direction about the fulcrum; means responsive to deviation of said factor from the predetermined value for positioning said fulcrumed member, means whereby when said fulcrum member is moved a predetermined amount in one direction about its fulcrum it effects actuation of one of the contact means of one of the pluralities of contact means and as said member is moved a further predetermined amount in the same direction it effects actuation of a second of the contact means of the same plurality of contact means; means whereby the actuation of the first of said contact means to be actuated on movement in either direction of the member from its normal position is effective in completing an electrical circuit by-passing said actuated contact means, periodic circuit interrupting means in the by-path circuit, said by-path circuit serving to maintain in operation said electric reversible means until opened by the periodic operation of said circuit interrupting means, periodic circuit interrupting means in the electrical circuit of the second of said contact means to be actuated on movement in either direction of the fulcrumed member from its normal position, and means for varying the periodic operation of each of said circuit interrupting means independently of the other circuit interrupting means.

JOSEPH C. ALBRIGHT.